United States Patent Office 3,574,739
Patented Apr. 13, 1971

---

3,574,739
ALKOXYBENZENESULFONAMIDES
Peter H. L. Wei, Upper Darby, Stanley C. Bell, Penn Valley, and Scott J. Childress, Philadelphia, Pa., assignors to American Home Products Corporation, New York, N.Y.
No Drawing. Continuation-in-part of application Ser. No. 522,050, Jan. 21, 1966. This application Apr. 25, 1968, Ser. No. 724,247
Int. Cl. C07c *143/78*
U.S. Cl. 260—556
7 Claims

ABSTRACT OF THE DISCLOSURE

N - (alkoxyalkylidene)alkoxybenzenesulfonamides (I) are provided by a process comprising treating an o-hydroxybenzenesulfonamide with a trialkyl orthoalkylate. Acid hydrolysis of (I) provides alkoxybenzenesulfonamides (II). Reaction of (II) with an alkyl halide provides N-(alkyl)alkoxybenzenesulfonamides (III). Compounds I, II, and III have pharmacological activity, especially as analgesics.

---

This application is a continuation-in-part of copending application Ser. No. 522,050, filed Jan. 21, 1966 and now abandoned.

This invention relates to new and useful sulfonamide derivatives as well as to a novel method for the preparation of N-(alkoxyalkylidene)alkoxybenzenesulfonamides. More particularly, the present invention is concerned with alkoxybenzenesulfonamides, N - (alkoxyalkylidene) alkoxybenzenesulfonamides and N-(alkyl)alkoxy benzenesulfonamides having pharmacological activity.

The novel compounds which are included within the scope of this invention are represented by the following formula:

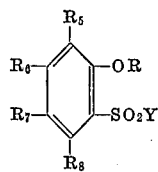

wherein R is lower alkyl; $R_6$, $R_7$ and $R_8$ are hydrogen, halogen or lower alkyl; Y is selected from the group consisting of

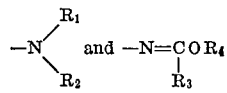

wherein $R_1$, $R_2$ and $R_3$ are selected from the group consisting of hydrogen and lower alkyl, and $R_4$ is the same as R and is lower alkyl; when Y is

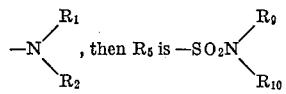

wherein $R_9$ and $R_{10}$ are the same as $R_1$ and $R_2$ and selected from the group consisting of hydrogen and lower alkyl, and when Y is

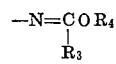

then $R_5$ is selected from the group consisting of hydrogen, halogen, lower alkyl and

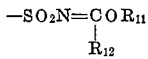

wherein $R_{11}$ is the same as R and $R_4$ and is lower alkyl, and $R_{12}$ is the same as $R_3$ and selected from the group consisting of hydrogen and lower alkyl.

Specific examples of such compounds include: 4-chloro-6 - ethoxy - m-benzenedisulfonamide; 4-chloro-6-ethoxy - N,N'-bis(ethoxymethylene) m - benzenedisulfonamide; and 6 - chloro-N,N'-bis(ethoxymethylene)-3-ethoxytoluene-2,4-disulfonamide.

The present invention also contemplates among its embodiments compounds of the formula:

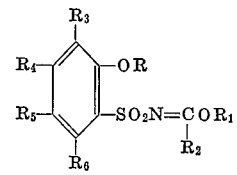

wherein R and $R_1$ are the same and are lower alkyl; $R_2$ is selected from the group consisting of hydrogen and lower alkyl; $R_3$ and $R_5$ are selected from the group consisting of hydrogen, halogen, lower alkyl and

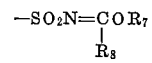

wherein $R_7$ is the same as R and $R_1$ and is lower alkyl, and $R_8$ is the same as $R_2$ and is selected from the group consisting of hydrogen and lower alkyl; and $R_4$ and $R_6$ are hydrogen, halogen or lower alkyl, with the proviso that only one of $R_3$ and $R_5$ can be

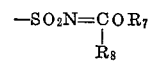

Illustrative members of this class are:
4 - chloro - 6 - methoxy-N,N'-bis-(α-methoxyethylidene)-m-benzenedisulfonamide; and
6 - bromo - N,N' - bis(α-propoxyethylidene) - 3 - propoxytoluene-2,4-disulfonamide.

As further embodiments this invention also contemplates compounds of the formula:

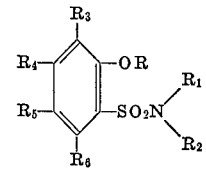

wherein R is lower alkyl; $R_4$, $R_5$ and $R_6$ are hydrogen, halogen or lower alkyl; $R_1$ and $R_2$ are selected from the group consisting of hydrogen and lower alkyl; and $R_3$ is

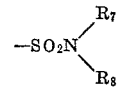

wherein $R_7$ and $R_8$ are the same as $R_1$ and $R_2$ and are selected from the group consisting of hydrogen and lower alkyl. Illustrative members of this class are:
4 - chloro - 6 - methoxy-N,N'-bis-(dimethyl)-m-benzenedisulfonamide; and
6 - bromo - N,N' - bis(diethyl)-3-propoxytoluene-2,4-disulfonamide.

When used herein and in the appended claims, the term "lower alkyl" and derivations thereof, such as "lower alkylidyne" include groups, both straight chain and branched, containing from about 1 to about 6 carbon atoms and include, for example, methyl, ethyl, n-propyl, i-propyl, n-butyl, t-butyl, n-pentyl, n-hexyl, and the like. "Halogen" includes chlorine, bromine, iodine and fluorine.

The N-(alkoxyalkylidene)alkoxybenzene sulfonamide compounds of the present invention are prepared by the process aspects of the present invention. This process in its broadest aspects involves the reaction of an o-hydroxybenzenesulfonamide of the formula:

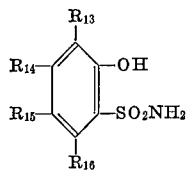

wherein $R_{13}$, $R_{14}$, $R_{15}$ and $R_{16}$ are selected from the group consisting of hydrogen, halogen, sulfamyl and lower alkyl, with the proviso that only two of $R_{13}$, $R_{14}$, $R_{15}$ and $R_{16}$ can be sulfamyl; with a trialkyl orthoalkylate of the formula:

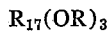

wherein $R_{17}$ is lower alkylidyne and R is lower alkyl.

In its most preferred aspects, the process is one for the production of a compound of the formula:

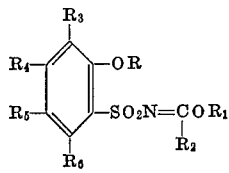

wherein R and $R_1$ are the same and are lower alkyl; $R_2$ is selected from the group consisting of hydrogen and lower alkyl; $R_3$ and $R_5$ are selected from the group consisting of hydrogen, halogen, lower alkyl and

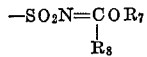

wherein $R_7$ is the same as R and $R_1$ and is lower alkyl, and $R_8$ is the same as $R_2$ and is selected from the group consisting of hydrogen and lower alkyl; and $R_4$ and $R_6$ are hydrogen, halogen or lower alkyl with the proviso that only one or $R_3$ and $R_5$ can be

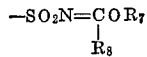

which consists of reacting a compound of the formula:

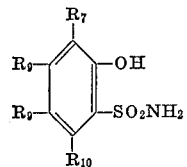

wherein $R_7$ and $R_9$ are selected from the group consisting of hydrogen, halogen, sulfamyl and lower alkyl; and $R_8$ and $R_{10}$ are hydrogen, halogen or lower alkyl, with the proviso that only one of $R_7$ and $R_9$ can be sulfamyl; with a compound of the formula:

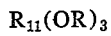

wherein $R_{11}$ is lower alkylidyne and R is as defined above, at a temperature that is in the range of from about 80° C. to about 250° C. for a period of from about one to about twenty-four hours.

These processes may be conducted by dissolving the o-hydroxybenzenesulfonamide in a sufficient amount of an appropriate liquid trialkyl orthoalkylate or by admixing approximately equimolar amounts of these reactants in a reaction-inert organic solvent. Thereafter the reaction mixture is heated at a temperature that is in the range of from about 80° C. to about 250° C. for a period from about one to about twenty-four hours. Preferably this reaction is conducted at the reflux temperature of the reaction mixture for a period of two to ten hours. After the reaction is complete, the reaction mixture is cooled and the solvent removed. Thereafter, the product may be recrystallized from a suitable solvent to obtain a pure crystalline product. Suitable solvents for this purpose are alkanols, glycol ethers, such as 2-methoxy ethanol and 2-ethoxy ethanol, as well as amides such as dimethylformamides and dimethylacetamide.

The novel alkoxy benzenesulfonamide and N-(alkyl)-alkoxy benzenesulfonamide compounds of the present invention may be prepared in accord with standard organic procedures well known to those skilled in the art. The alkoxybenzenesulfonamides of this invention may easily be prepared by the acid hydrolysis of the corresponding N - (alkoxyalkylidene)alkoxybenzenesulfonamide compounds. This reaction is conducted in reaction-inert organic solvent, by the heating of th reaction mixture containing an appropriate N - (alkoxyalkylidene)alkoxybenzenesulfonamide and a mineral acid, at a temperature range from about 60° C. to about 100° C. for a period of from about fifteen minutes to about four hours. When hydrolysis is complete, the resulting alkoxybenzenesulfonamide product is obtained by conventional methods such as filtration and recrystallization.

The N-(alkyl)alkoxybenzenesulfonamides of this invention may easily be prepared by reacting of the corresponding alkoxybenzenesulfonamide with an alkyl halide. This reaction may be conducted in an aqueous alkaline solution by the heating of the reaction mixture containing the appropriate starting compounds at a temperature range from about 20° C. to about 100° C. for a period of from about one half hour to about five hours. When the alkylation is complete, the resulting N-(alkyl)alkoxybenzenesulfonamide product is obtained by conventional procedures such as extraction, concentration and crystallization.

The above designated time and temperature ranges are not critical and simply represent the most convenient ranges consistent with carrying out these reactions in a minimum of time without undue difficulty. Thus, reaction temperatures appreciably below these can be used, but their use considerably extends these reaction times. Similarly, reaction temperatures higher than those mentioned can be employed with a concomitant decrease in reaction times. By reaction-inert organic solvent as employed herein is meant an organic solvent which dissolves the reactants and does not prevent or interfere with their interaction. Among the preferred solvents are benzene, toluene, xylene, chloroform and liquid alkanes, such as pentane and hexane. The amount of solvent used is not critical, it being only necessary to use sufficient solvent to provide a reaction medium for the reactants.

Many of the precursor phenols utilized in the preparation of the corresponding benzenesulfonyl chlorides are known compounds which are readily available from commercial sources, while the remainder can easily be prepared in accordance with standard organic procedures well known to those skilled in the art. The method of preparing these benzene sulfonyl chlorides is claimed and disclosed in copending application "4,1,2-Benzoxathiazine Dioxides and Intermediates in their Preparation," Ser. No. 391,325, filed on Aug. 21, 1964, now U.S. 3,277,087. The ammonolysis of a benzenesulfonyl chloride to the corresponding sulfonamide, starting material for the compounds of the present invention, is accomplished by the well known interaction of a sulfonyl chloride with excess ammonia.

The new N-(alkoxyalkylidene)alkoxybenzenesulfonamides, alkoxybenzenesulfonamides and N-(alkyl)alkoxybenzenesulfonamides of this invention have demonstrated pharmacological activity. In particular they have been found to exert an analgesic activity when tested under standard and accepted pharmacological procedures in warm blooded lower animals, such as mice and rats. They are, therefore, deemed to possess utility in experimental and comparative pharmacology and are of value to treat conditions in animals, such as valuable domestic animals, and in laboratory animals, such as mice, rats and the like, responsive to treatment with analgesic agents, such as the need to relieve pain.

When used pharmacologically, the compounds of this invention shown by the above formulae may be administered either alone or in combination with other pharmacologically-active ingredients. Whether singly or in combination, they may be used in the form of solid compositions combined, if desired, with extenders or carriers that are relatively non-toxic or inert. They may be put into tablet, capsule or powder form. On the other hand, they may be administered in liquid form as a suspension or solution in a suitable vehicle for oral or parenteral use. As will be shown hereinafter, useful pharmacological action as analgesics in mice will be achieved if the active ingredient is administered orally at a dosage of 400 mg./kg.

DESCRIPTION OF THE PREFERRED EMBODIMENTS

The following examples are given by way of illustration and are not to be construed as limitations of this invention, many variations of which are possible without departing from the scope and spirit thereof.

EXAMPLE I

To cold chlorosulfonic acid (550 ml.) there is slowly added 200 g. of 4-chloro-3-methylphenol and the resulting solution is heated on a steam bath for two hours. Upon cooling, thionyl chloride (200 ml.) is slowly added to the mixture which is again heated for one-half hour and then chilled. The resulting solid is collected, dissolved in benzene, washed with water and dried over anhydrous magnesium sulfate. After removal of the benzene, the residue is treated with hexane to yield 300 g. of crude product which is recrystallized from a benzene-hexane mixture to yield 6-chloro-3-hydroxytoluene-2,4-disulfonyl chloride, M.P. 80–1° C.

*Analysis.*—Calcd. for $C_7H_9ClN_2O_5S_2$ (percent): C, 24.75; H, 1.47; Cl, 31.25; S, 18.75. Found (percent) C, 25.05; H, 1.50; Cl, 30.80; S, 18.30.

The above prepared 6-chloro-3-hydroxytoluene-2,4-disulfonyl chloride (30 g.) is slowly added to a cold concentrated ammonium hydroxide solution (200 ml.). The resulting solid is collected, dissolved in water and acidified with hydrochloric acid. The precipitate (21 g.) which develops is recrystallized from ethanol to yield 6-chloro-3-hydroxytoluene-2,4-disulfonamide, M.P. 254–6° C.

*Analysis.*—Calcd. for $C_7H_9ClN_2O_5S_2$ (percent): C, 28.00; H, 3.03; Cl, 11.83; N, 9.33; S, 21.30. Found (percent): C, 28.17; H, 2.96; Cl, 11.80; N, 9.36; S, 21.40.

This 6-chloro-3-hydroxytoluene-2,4-disulfonamide (5.0 g.) is dissolved in 25 ml. of triethyl orthoformate and heated at 150–190° C. for two hours. After the solvent is removed, the residual solid is collected and recrystallized from ethanol. In this manner, 6-chloro-N,N'-bis(ethoxymethylene)-3-ethoxytoluene-2,4-disulfonamide (4.0 g.) M.P. 121–2° C., is obtained.

*Analysis.*—Calcd. for $C_{15}H_{21}ClN_2O_7S_2$ (percent): C, 40.80; H, 4.81; Cl 8.06; N, 6.35; S, 14.55. Found (percent): C, 40.66; H, 4.53; Cl, 8.30; N, 6.44; S, 14.60. Similarly, 2-chloro-N,N'-bis(α-ethoxypropylidene)-4-ethoxytoluene-3,5-disulfonamide is produced.

EXAMPLE II

The 6-chloro-N,N'-bis(ethoxymethylene)-3-ethoxytoluene-2,4-disulfonamide (5.0 g.) of Example I is dissolved in ethanol. A few drops of hydrochloric acid are added and the resulting solution heated on a steam bath for one-half hour. Upon cooling, the resulting precipitate is recrystallized from ethanol to yield 6-chloro-3-ethoxytoluene-2,4-disulfonamide.

In the same manner, 2-chloro-N,N'-bis(α-ethoxypropylidene)-4-ethoxytoluene-3,5-disulfonamide is hydrolyzed to yield 2-chloro-3-ethoxytoluene-3,5-disulfonamide.

EXAMPLE III

To 6-chloro-3-ethoxytoluene-2,4-disulfonamide (5.0 g.) of Example II in an ethanolic 0.1 N sodium hydroxide solution (100 ml.) there is added ethyl bromide (5.5 g.) and the resulting mixture is heated on a steam bath for one hour. Upon cooling, the solvent is removed under vacuum and the residue recrystallized from methanol to yield 6-chloro-N,N'-bis(diethyl)-3-ethoxytoluene-2,4-disulfonamide.

Similarly, 2-chloro-4-ethoxytoluene-3,5-disulfonamide is reacted with methyl sulfate to produce 2-chloro-4-ethoxy-N,N'-bis(dimethyl)toluene-3,5-disulfonamide.

EXAMPLE IV m-Chlorophenol (200 g.) is gradually added to cold chlorosulfonic acid (500 ml.), the mixture is heated in a water bath for two hours and then cooled. Thionyl chloride (200 ml.) is gradually added to the mixture which is then again warmed in a water bath for one hour and then chilled. After extraction with benzene, the benzene fraction is separated, washed with water, dried over anhydrous magnesium sulfate and then evaporated. The residual solid is recrystallized from benzene to yield 4-chloro-5-hydroxy-m-benzenedisulfonyl chloride.

The above prepared 4-chloro-6-hydroxy-m-benzenedisulfonyl chloride (40 g.) is slowly added to a concentrated ammonium hydroxide solution (300 ml.). The resulting solution is heated on a steam bath for one hour, treated with charcoal, cooled and then acidified with hydrochloric acid. The white precipitate is collected, washed with water and dried. Upon recrystallization from ethanol, there is obtained 4-chloro-6-hydroxy-m-benzenedisulfonamide, M.P. 255° C.

*Analysis.*—Calcd. for $C_6H_7ClN_2O_5S_2$ (percent): C, 25.10; H, 2.45; Cl, 12.38; N, 9.77; S, 22.30. Found (percent): C, 25.28; H, 2.62; Cl, 12.20; N, 9.85; S, 21.90.

The 4-chloro-6-hydroxy-m-benzenedisulfonamide (5.0 g.) is dissolved in 25 ml. of triethyl orthoformate and the solution is heated at 150–190° C. for two hours. The solvent is removed, the residue collected and washed with ether (3.7 g.). This crude material is recrystallized from ethanol to yield 4-chloro-6-ethoxy-N,N'-bis(ethoxymethylene)-m-benzenedisulfonamide, M.P. 121–2° C.

*Analysis.*—Calcd. for $C_{14}H_{19}ClH_2O_7S_2$ (percent): C, 39.30 H, 4.49; Cl, 8.32; N, 6.57; S, 15.00. Found (percent): C, 39.76; H, 4.33; Cl, 8.50; N, 6.59; S, 14.50.

In the same manner, 3-fluoro-5-isobutyl-N-(α-methoxyethylidene)-2-methoxybenzenesulfonamide and 5-chloro-N,N'-bis(methoxymethylene) - 6 - methoxy-m-benzenedisulfonamide are produced.

EXAMPLE V

N,N'-bis(ethoxymethylene)-4-chloro-6-ethoxy-m-benzenedisulfonamide (5.0 g.) is dissolved in ethanol. After a few drops of hydrochloric acid are added, the resulting solution is heated on a steam bath for one-half hour. Upon cooling, the precipitate is separated and recrystallized from ethanol to yield 4-chloro-6-ethoxy-m-benzenedisulfonamide, M.P. 238–240° C.

*Analysis.*—Calc'd. for $C_8H_{11}ClH_2O_5S_2$ (percent): C, 30.50; H, 3.53, Cl, 11.28; N, 8.91; S, 20.35. Found (percent): C, 30.72; H, 3.51; Cl, 11.30; N, 8.81; S, 19.50.

Similarly, 3-fluoro-5-isobutyl-2-methozybenzenesulfonamide and 5-chloro-6-methoxy-m-benzene-disulfonamide are produced.

EXAMPLE VI

To 4-chloro-6-ethoxy-m-benzenedisulfonamide (2.5 g.) in aqueous 0.2 N potassium hydroxide solution (60 ml.), there is added propyl chloride (3.0 g.). The resulting mixture is heated to 75° C. for one hour and then evaporated to dryness. Upon recrystallization from ethanol, there is obtained 4-chloro-6-ethoxy-N,N'-bis(dipropyl)-m-benzenedisulfonamide.

By the above procedure 3-fluoro-5-isobutyl-2-methoxy-N,N'-bis(dimethyl)benzenesulfonamide and 5 - chloro-6-methoxy-N,N'-bis(dimethyl) - m - benzene-disulfonamide are obtained.

EXAMPLE VII

Employing the procedure of Examples I and IV the hereinafter listed N-(alkoxyalkylidene)alkoxybenzenesulfonamides are produced:

6-chloro-N,N'-bis(α - propoxypropylidene)-5-propoxy toluene-2,4-disulfonamide;

5-bromo - 2 - butoxy-N-(butoxymethylene)-3-butylbenzenesulfonamide;

4-bromo - 6 - pentoxy-N,N'-bis-(α-pentoxybutylidene)-m-benzenedisulfonamide;

2 - ethoxy-N-(ethoxymethylene)-3,5-diethylbenzenesulfonamide; and 2-ethoxy - 3 - bromo-N-(α-ethoxyethylidene)-5-pentylbenzenesulfonamide.

EXAMPLE VIII

Utilizing the procedure described in Examples II and V to hydrolyze the compounds of Example VII, the following alkoxybenzene sulfonamides are produced:

6-chloro-5-propoxytoluene-2,4-disulfonamide;
5-bromo-2-butoxy-3-butylbenzenesulfonamide;
4-bromo-6-pentoxy-m-benzenedisulfonamide;
2-ethoxy-3,5-diethylbenzenesulfonamide; and
2-ethoxy-3-bromo-5-pentylbenzenesulfonamide.

EXAMPLE IX

The procedure of Examples III and VI is repeated, reacting an appropriate alkyl halide with the alkoxybenzene sulfonamides of Example VIII to produce the following N-(alkyl)alkoxybenzene sulfonamides:

6-chloro-N,N'-bis(dipentyl)-5-propoxytoluene-2,4-disulfonamide;

5-bromo-2-butoxy-N-(methyl)-3-butylbenzenesulfonamide;

4-bromo-6-pentoxy-N,N'-bis(diethyl)-m-benzenedisulfonamide;

2-ethoxy-N-(propyl)-3,5-diethylbenzenesulfonamide; and
2-ethoxy-3-bromo-N-(butyl)-5-pentylbenzenesulfonamide.

EXAMPLE X 4,5 - dichloro - 6 - hydroxy-m-benzene-disulfonamide (2.5 g.) is admixed with trimethyl orthoacetate (10.0 g.) in toluene (100 ml.) and the mixture is heated at 85° C. for twenty-four hours. Subsequently, the solvent is removed under vacuum and the residue recrystallized from dimethylformamide to yield 4,5-dichloro-6-methoxy-N,N-bis(α-methoxyethylidene)-m-benzene-disulfonamide.

Upon hydrolysis of the above product by the procedure of Example II, 4,5-dichloro-6-methoxy-m-benzene-disulfonamide is obtained. This product is reacted with methyl bromide by the procedure of Example III to yield 4,5-dichloro - 6 - methoxy - N,N' - bis(dimethyl)-m-benzene-disulfonamide.

EXAMPLE XI

5 - bromo - 3 - hydroxytoluene-2,4-disulfonamide (3.0 g.) is admixed with tripropyl orthoacetate (15.0 g.) in xylene (150 ml.) and the mixture is then heated at reflux for fifteen hours. Thereafter, the xylene is removed under vacuum and the residue recrystallized from ethanol to yield 5-bromo-N,N'-bis(α-propoxyethylidene)-3-propoxytoluene-2,4-disulfonamide.

In evaluating the instant compounds for pharmacological activity, they are tested in vivo by standard methods with the following results. The "Eddy Hot-Plate Method" [Nathan B. Eddy and Dorothy Leimbach, J. Pharmacol. Exper. Therap. 107, 385 (1953)] is used to test for analgesia. The compound is administered orally, emulsified at 1% concentration in sterile water with polyethylene oxide sorbitan monooleate, to three mice (CF-1, 14 to 24 grams). The animals are kept on the hot-plate for a maximal period of 30 seconds. Those animals in which the reaction time is increased to at least twice the mean reaction time for the control animals are taken as showing analgesia.

In this test, 4-chloro-6-ethoxy-N,N'-bis(ethoxymethylene) - m - benzenedisulfonamide and 6-chloro-N,N'-bis-(ethoxymethylene)-3-ethoxytoluene-2,4-disulfonamide induced analgesia in the test animals when administered at a dose of 400 mg./kg. of body weight.

We claim:
1. A compound of the formula

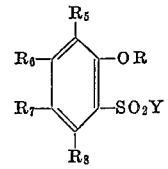

wherein R is lower alkyl; $R_6$, $R_7$ and $R_8$ are hydrogen, halogen, or lower alkyl; Y is

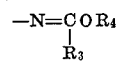

wherein $R_3$ is selected from the group consisting of hydrogen and lower alkyl; $R_4$ is the same as R and is lower alkyl; $R_5$ is selected from the group consisting of hydrogen, halogen, lower alkyl and

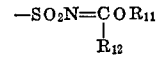

wherein $R_{11}$ is the same as R and $R_4$ and is lower alkyl, and $R_{12}$ is the same as $R_3$ and selected from the group consisting of hydrogen and lower alkyl.

2. 4-chloro-6-ethoxy - N,N' - bis(ethoxymethylene)-m-benzenedisulfonamide.

3. A compound as described in claim 1 which is: 6-chloro-N,N'-bis(ethoxymethylene) - 3 - ethoxytoluene-2,4-disulfonamide.

4. A compound of the formula:

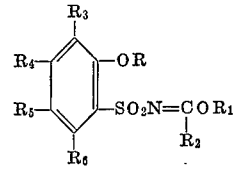

wherein R and $R_1$ are the same and are lower alkyl; $R_2$ is selected from the group consisting of hydrogen and lower alkyl; $R_3$ and $R_5$ are selected from the group consisting of hydrogen, halogen, lower alkyl and

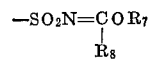

wherein $R_7$ is the same as R and $R_1$ and is lower alkyl, and $R_8$ is the same as $R_2$ and is selected from the group consisting of hydrogen and lower alkyl; and $R_4$ and $R_6$ are hydrogen, halogen or lower alkyl, with the proviso that only one of $R_3$ and $R_5$ can be

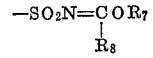

5. A compound as described in claim 4 which is: 4-chloro - 6 - methoxy-N,N'-bis(α-methoxyethylidene)-m-benzenedisulfonamide.

6. A compound as described in claim 4 which is: 6 - bromo - N,N' - bis(α-propoxyethylidene)-3-propoxytoluene-2,4-disulfonamide.

7. A process for the production of a compound of the formula:

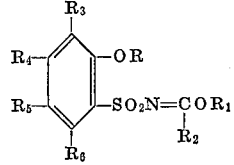

wherein R and $R_1$ are the same and are lower alkyl; $R_2$ is selected from the group consisting of hydrogen and lower alkyl; $R_3$ and $R_5$ are selected from the group consisting of hydrogen, halogen, lower alkyl and

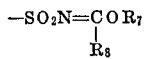

wherein $R_7$ is the same as R and $R_1$ and is lower alkyl, and $R_8$ is the same $R_2$ and is selected from the group consisting of hydrogen and lower alkyl; and $R_4$ and $R_6$ are hydrogen, halogen or lower alkyl with the proviso that only one or $R_3$ and $R_5$ can be

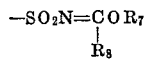

which consists of reacting a compound of the formula:

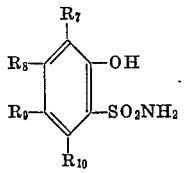

wherein $R_7$ and $R_9$ are selected from the group consisting of hydrogen, halogen, sulfamyl and lower alkyl; and $R_8$ and $R_{10}$ are hydrogen, halogen or lower alkyl, with the proviso that only one of $R_7$ and $R_9$ can be sulfamyl; with a compound of the formula:

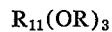

wherein $R_{11}$ is lower alkylidyne and R is as defined above, at a temperature that is in the range of from about 80° C. to about 250° C. for a period of from about one to about twenty-four hours.

References Cited
UNITED STATES PATENTS 3,417,122  12/1968  McManus _____ 260—556S

OTHER REFERENCES

Topliss et al., J. Med. Chem., vol. 6, pp. 312–15 (1963), RSI J5.

Jackman et al., J. Pharm. & Pharmacol., vol. 12, pp. 648, 650–51 (1960) RSI J65.

HENRY R. JILES, Primary Examiner

S. D. WINTERS, Assistant Examiner

U.S. Cl. X.R.

424—321; 260—615